March 12, 1929.  H. W. KRAMER  1,705,255
HANDLE FOR WOODEN BASKETS
Filed April 30, 1926
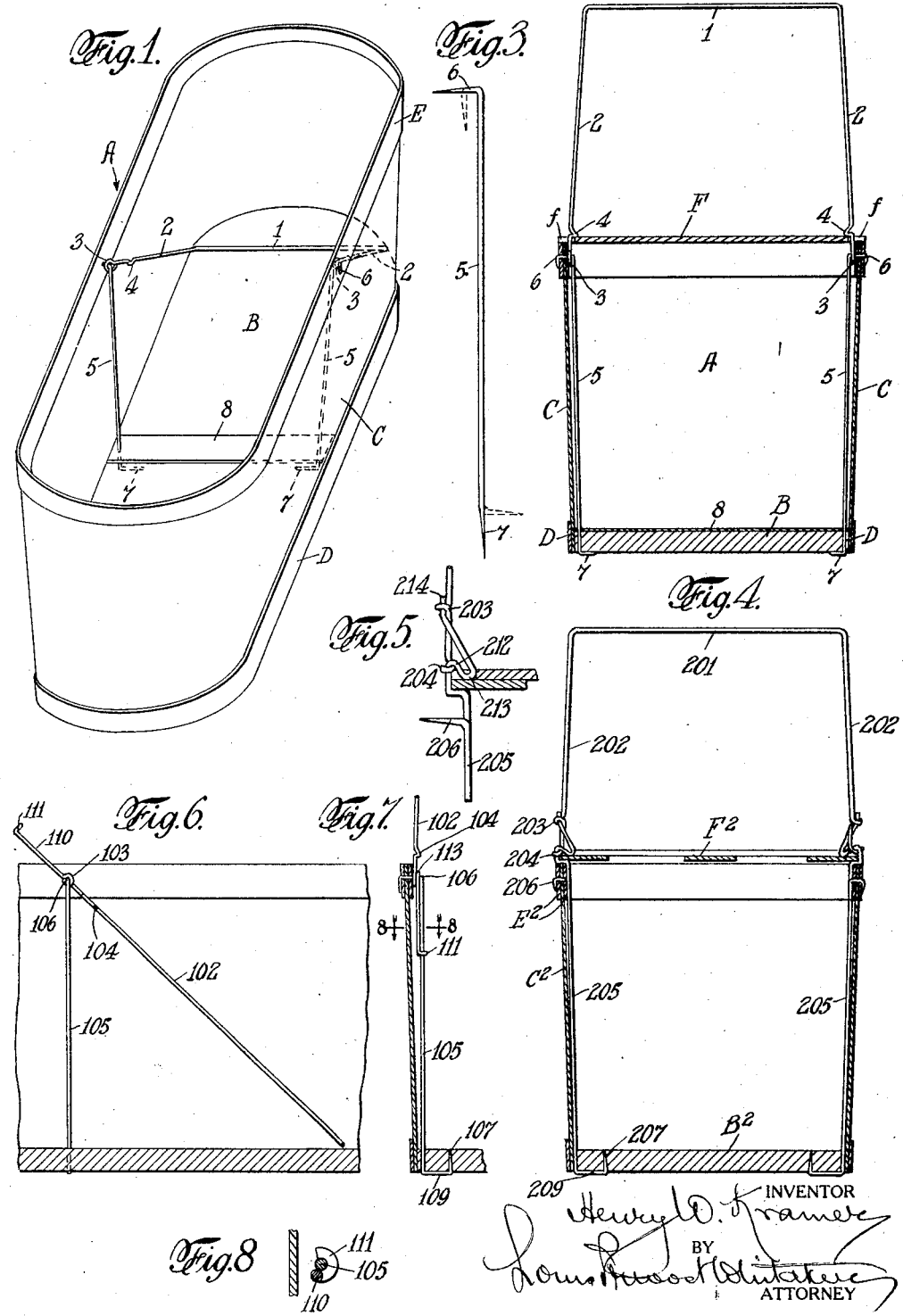

Patented Mar. 12, 1929.

1,705,255

UNITED STATES PATENT OFFICE.

HENRY W. KRAMER, OF KINGSTON, NEW YORK, ASSIGNOR TO RALPH P. YOUNG, OF MARLBORO, NEW YORK.

HANDLE FOR WOODEN BASKETS.

Application filed April 30, 1926. Serial No. 105,679.

My invention consists in the novel features hereinafter described, reference being had to the accompanying drawing, which illustrates several embodiments of the same selected by me for purposes of illustration, and the said invention is fully disclosed in the following description and claims.

The object of my invention is to provide a metallic handle for supporting and carrying a wooden basket of the type ordinarily used for holding and transporting grapes and other fruit, vegetables, etc. As ordinarily constructed such baskets are usually provided with handles formed of a thin strip of veneer bent into inverted U-form and secured to the sides of the basket by tacks or staples. These handles are very much in the way in the packing of baskets and preparing them for shipment, as they prevent nesting of the baskets, and the handles are frequently broken or detached from the baskets with consequent loss not only of the basket, but of its contents. These baskets are ordinarily composed of a solid wooden bottom of considerable thickness around the edges of which are secured sides of wood veneer which are bound around the bottom on the outside and around the upper edge, usually both inside and outside, with narrow binding strips of wood veneer secured in place by tacks or small nails, or staples. It follows, therefore, that in providing a metal handle for such a basket, it is very desirable to so construct it or attach it that it will be connected with the bottom of the basket so as to support the contents without undue vertical strain on the sides or on the binding strips, or their attaching means. It is also desirable that the handle, as far as possible, may be attached to the basket in the process of manufacturing the basket, that is to say, at the factory, and that it be so constructed as to permit of the nesting of the baskets in considerable numbers, as, say twenty five, for example, to a nest, for convenience in shipping the baskets from the factory to the point where they are to be packed. In carrying out my present invention I provide a metallic handle which comprises a bail member and two side members adapted to be attached to the basket adjacent to the inner faces of the side portions thereof, and effecting a direct connection betwen the bail member and the bottom of the basket for supporting the contents of the basket without vertical strain on the side portions of the same. The bail member may be detachably connected with the side members so as to permit the baskets to be nested and the bail members to be attached thereto at the point where the baskets are filled, or the bail member may be pivotally connected with the side members in such manner that it can be folded down inside of the basket and made to lie closely adjacent to the sides and bottom of the same, and thereby permit of the nesting of the baskets for shipment. In the latter case, the entire handle can be attached to the basket at the factory before shipment, whereas in the first mentioned case, the bail members will be ordinarily packed in the topmost basket of each nest and attached to the individual baskets at the point where they are packed. In both cases, however, when the baskets are being packed, and when packed for shipment, the bottom of the basket will be directly connected to the handle and support the contents. Where the bail member is pivotally connected with the side members, my invention also contemplates locking means by which the bail member may interlock with portions of the side members so as to hold the bail stiffly with respect thereto, and in alignment therewith, as for example, while the basket is being packed, or at any other time, as desired.

In the accompanying drawings,

Fig. 1 is a perspective view showing a wooden basket provided with one form of my improved handle in which the bail is pivotally connected with the side members and located inside of the basket.

Fig. 2 represents a vertical sectional view of the same showing the cover in place and held against longitudinal and vertical movement by engagement with the bail member.

Fig. 3 is a detail view of one of the side members.

Fig. 4 is a sectional view similar to Fig. 2 showing a modified construction in which the bail member is detachably connected with the side members.

Fig. 5 is a detail view of one of the side members shown in Fig. 4.

Fig. 6 is a partial sectional view similar to Fig. 2, showing a pivoted bail provided with locking devices for engaging the side members and locking the bail member in vertical position.

Fig. 7 is a detail view of portions of the bail member and a side member, shown in Fig. 6.

Fig. 8 is a section taken on the line 8—8 of Fig. 7.

In the accompanying drawing, A, represents the basket, which consists of the wooden bottom, B, side pieces of veneer, indicated at C. D represents the binding strips around the bottom of the basket, and E, represents the binding strips around the upper edge of the sides, C, these baskets being of usual and well known construction. In the form of my invention illustrated in Figs. 1 and 2, the handle comprises a bail member comprising the horizontal portion, or hand engaging portion, 1, and the arm portions, 2, provided at their lower ends with loops, or eyes, indicated at 3, to pivotally engage the upper ends of the side members, the arms, 2, being also provided with inwardly extending cover retaining shoulders, indicated at 4, for holding the cover in place. 5—5 represents the side members which are vertical rods or bars, each of which is provided at its upper end with a horizontally disposed point, 6, adapted to be placed in engagement with one of the eyes, 3, of the bail member and forced through the upper binding strips and side portion of the basket from the inside outwardly and clinched at the outer side of the basket, indicated in dotted lines in Fig. 3, thus uniting it to the basket and pivotally connecting one end of the bail member thereto. The lower end of the side member, 5, is also provided with a point, as indicated at 7, which is adapted to be driven through the bottom of the basket and is then bent laterally, as indicated in dotted lines in Fig. 3 beneath the bottom, B, of the basket. Where the bottom, B, of the basket, is rather light, I may advantageously provide a metallic plate, indicated at 8, either above or below the bottom, B, of the basket, said plate having holes through which the side members pass, for stiffening the basket at the bottom, preventing the lateral spread of the basket at that point, and adding generally to the ruggedness of the basket.

It will be seen by this construction, that the bail member will be pivotally connected with the basket with its arms, 2—2, inside of the same, and closely adjacent to the sides of the basket. The bail member will be so formed that it can be dropped within the basket until the hand engaging portion, 1, rests on the bottom, and the arms, 2—2, lie closely adjacent to the sides of the basket, as indicated in Fig. 1. The side members, 5—5, also lie close to the sides of the basket, and the baskets with the handles attached may be nested in the same manner as they could be without handles. When the baskets of a nest are separated, the bail member can be swung into a vertical position, as shown in Fig. 2, to support the basket, while it is being packed, or for carrying it and it will be observed that the upward lift of the handle is transferred directly by the side members, 5, to the bottom of the basket, so that the sides of the basket are relieved entirely from vertical strain, from the weight of the contents of the basket. In Fig. 2 I have shown the basket provided with a cover, indicated at F, which is provided at each side with a notch, $f$, to engage the bail member and prevent the longitudinal movement of the cover, and it will be seen that the cover retaining shoulders, 4, of the bail member will engage the cover at the inner edges of the notches, $f$, and hold the cover against vertical movement.

In some instances it may be desirable to have the bail when raised into vertical position, securely locked against pivotal movement with respect to the side members. In Figs. 6 and 7 I have shown a slight modification of the form of my handle just described, in which the corresponding parts are given the same reference numerals with 100 added. In this form the side arms, 102, of the bail member are preferably bent to form a loop, 103, to engage the portion, 106, of a side member, 105, and are provided beyond this loop with an arm, 110, provided at its outer end with a locking portion, conveniently made in the form of a half loop, or bend, 111, and constructed to snap over and interlock with a portion of the side member, 105, when the bail member is swung upward into vertical position, the material from which the bail member is constructed, having sufficient resilience to permit this interlocking of the side member with the locking portion, 111, of the bail member at each side of the basket. This construction will enable the bail member to be maintained in vertical position whenever it is so placed, and will, in some instances, be desirable in order to facilitate the filling and packing of the baskets, while the bail member can be folded down at any time, swinging on its pivotal connections with the side members, by forcibly disengaging the locking portions, 111, from the side members. This locking arrangement for the pivoted bail has a tendency to stiffen the handle structure and facilitate the control of the basket by means of the handle.

In Figs. 4 and 5 I have shown another modification of my invention in which the bail member is detachable, the side members and bail member being provided with guiding and locking means by which they may be united at any time. In this construction the bail member is provided with a hand engaging portion, 201, and side arms, 202, each of which is provided with a guiding portion, as a horizontally disposed loop, 203, and a locking portion, as a hook-shaped portion, 204, at its lower end. Each of the side members, indicated at 205, is provided with clinching points, 206 and 207, and in this instance I have shown the lower end of each side member provided with a horizontal portion, 209, extending beneath the bottom, B², of the basket, so that the clinching point, 207, extends vertically up through the basket from the bottom, but this is not essential. Where this type of side member is employed, it will be conveniently driven through the bottom of the basket, the portion, 209, will be bent over and the portion, 207, bent upwardly and driven up into or through the bottom, after which the clinching point, 206, will be driven outwardly through the upper binding strips, E², and the side, C², and clinched. In this instance the upper portion of each of the side bars, 205, is provided with an outwardly extending portion, forming a loop, 212, an inwardly extending retaining shoulder, 213, and an upwardly extending guiding portion, 214. To attach the bail member, the guiding loops, 203, thereof, are made to engage the upper ends of the guiding portions, 214, and the locking hook portions, 204, are made to engage the loop portions, 212, of the side members, as clearly shown in Figs. 4 and 5, for effecting an interlocking engagement, the locking hooks, 204, being held against accidental displacement by the guiding engagement between the parts, 203 and 214. The shoulder, 213, preferably engages the cover, F², in such a manner as to hold it against both vertical and longitudinal movement. These covers are ordinarily made out of strips extending longitudinally of the basket, and transverse cleats extending at intervals across the longitudinal strips, and nailed or otherwise secured thereto. The locking shoulders, 213, preferably engage a notch or recess, formed in the cover, as for example, in the transverse cleat thereof, and serve the purpose therefore, of both holding the cover against vertical, and also against longitudinal movement.

It will be seen that where this form of handle is used, the side members can be attached to the basket at the time of its manufacture, and if the baskets are to be nested a suitable number of bail members for the baskets of the entire nest can be conveniently packed in the topmost basket, and the handles attached to the baskets after they are delivered.

What I claim and desire to secure by Letters Patent is:—

1. A handle for wooden baskets, comprising among its members a pair of side members adapted to extend vertically along the inner faces of the opposite sides of the basket, and each provided adjacent to its upper end with means for permanently attaching it to the adjacent side of the basket, and at its lower end with means for connecting it directly with the bottom of the basket to provide a direct support therefor, and a bail member having a hand engaging portion and side arms extending downwardly therefrom, and constructed to engage said side members.

2. A handle for wooden baskets, comprising among its members, vertically disposed side members for engaging the inner faces of opposite sides of the basket and provided at their upper ends with means for permanently securing them to the sides of the basket adjacent to the top edge thereof, and provided at their lower ends with portions adapted to extend directly through the bottom of the basket and be permanently secured thereto, and a bail member having side portions for engaging said side members, whereby in lifting the basket by the handle, the weight of the contents will be supported substantially entirely by the bottom.

3. A handle for wooden baskets, comprising two side members for engaging the inner faces of the basket at opposite points, each provided adjacent to its upper end with means for permanently attaching it to the basket adjacent to the upper edge of the side portion thereof, and provided at its lower end with means for connecting it directly with the bottom of the basket to provide a direct support therefor, and a bail member pivotally engaging said side members within the sides of the basket and adapted to fold down inside of the basket to permit the nesting of the baskets after the handle is applied thereto.

4. A handle for wooden baskets, comprising two side members for engaging the inner faces of the basket at opposite points, each provided adjacent to its upper end with means for permanently attaching it to the basket adjacent to the upper edge of the side portion thereof, and provided at its lower end with means for connecting it directly with the bottom of the basket to provide a direct support therefor, and a bail member comprising a hand engaging portion and lateral arms pivotally connected to the side members adjacent to their upper ends within the sides of the basket, said arms being of such length as to permit the bail member to be folded down within the basket with its hand engaging portion resting on the bottom and its lateral arms lying close to the sides of the basket to permit of the nesting of the baskets after the handle has been applied thereto.

5. A handle for wooden baskets, comprising two side members for engaging the inner faces of the basket at opposite points, each provided adjacent to its upper end with means for permanently attaching it to the basket adjacent to the upper edge of the side portion thereof, and provided at its lower end with means for connecting it directly with the bottom of the basket to provide a direct support therefor, and a bail member comprising a hand engaging portion and lateral arms pivotally connected to the side members adjacent to their upper ends within the sides of the basket, said arms being of such length as to permit the bail member to be folded down within the basket with its hand engaging portion resting on the bottom and its lateral arms lying close to the sides of the basket to permit of the nesting of the baskets after the handle has been applied thereto, the arms of the bail member and said side members being provided with means for positively interlocking them when the handle is swung on its pivotal connections with the side members in the vertical position.

6. A handle for wooden baskets, comprising two side members for engaging the inner faces of the basket at opposite points, each provided adjacent to its upper end with means for permanently attaching it to the basket adjacent to the upper edge of the side portion thereof, and provided at its lower end with means for connecting it directly with the bottom of the basket to provide a direct support therefor, and a bail member comprising a hand engaging portion and lateral arms pivotally connected to the side members adjacent to their upper ends within the sides of the basket, said arms being of such length as to permit the bail member to be folded down within the basket with its hand engaging portion resting on the bottom and its lateral arms lying close to the sides of the basket to permit of the nesting of the baskets after the handle has been applied thereto, the arms of said bail member being provided with portions extending beyond their pivotal connections with the side members, said bail arm extensions and said side members being provided with interlocking portions adapted to be brought into engagement with each other when the bail member is in vertical position to lock the bail member rigidly with respect to said side members.

7. A handle for wooden baskets, comprising two side members for engaging the inner faces of the basket at opposite points, each provided adjacent to its upper end with means for permanently attaching it to the basket adjacent to the upper edge of the side portion thereof, and provided at its lower end with means for connecting it directly with the bottom of the basket to provide a direct support therefor, and a bail member comprising a hand engaging portion and lateral arms pivotally connected to the side members adjacent to their upper ends within the sides of the basket, said arms being of such length as to permit the bail member to be folded down within the basket with its hand engaging portion resting on the bottom and its lateral arms lying close to the sides of the basket to permit of the nesting of the baskets after the handle has been applied thereto, the arms of the bail member having extensions projecting beyond their pivotal connections with the side members and provided adjacent to their outer ends with locking devices, each adapted to engage the adjacent side member between its points of connection with the basket to lock the bail member rigidly with respect to the side members when the bail member is in vertical position.

8. A handle for wooden baskets comprising side members for engaging the inner faces of the sides of the baskets at opposite points, each of said side members being provided at its upper end with a horizontal, outwardly extending attaching device adapted to pass through the basket and to be bent over to secure the side member rigidly thereto, each side member being provided at its lower end with a portion adapted to extend directly through the bottom of the basket and to be bent over to connect the side member rigidly with the bottom of the basket, and a bail member having a hand engaging portion and side arms for pivotally engaging the horizontally disposed portions of said side members adjacent to their upper ends within the sides of the basket, to enable the bail member to be swung down inside of the basket and permit the nesting of the baskets after the handles are attached thereto.

9. A handle for wooden baskets comprising side members for engaging the inner faces of the sides of the baskets at opposite points, each of said side members being provided at its upper end with a horizontal, outwardly extending attaching device adapted to pass through the basket and to be bent over to secure the side member rigidly thereto, each side member being provided at its lower end with a portion adapted to extend directly through the bottom of the basket and to be bent over to connect the side member rigidly with the bottom of the basket, and a bail member having a hand engaging portion and side arms for pivotally engaging the horizontally disposed portions of said side members adjacent to their upper ends within the sides of the basket, to enable the bail member to be swung down inside of the basket and permit the nesting of the baskets after the handles are attached thereto, said side arms being provided with extensions projecting beyond their pivotal connection with the side members, and each provided with locking means for engaging the adjacent side member between its points of connection with the basket when the bail member is in vertical position.

10. A handle for wooden baskets, comprising a pair of side members for engaging the inner faces of the sides of the basket at opposite points, each of said side members being provided at its upper end with a horizontally extending attaching point adapted to pass through the side of the basket adjacent to its upper edge and secured thereto, each side member being provided on its lower end with an attaching point adapted to pass directly through the bottom of the basket and be secured thereto, and a bail member comprising a hand engaging part and side arms having integral loops for surrounding and pivotally engaging the horizontal attaching points at the upper ends of the said arms on the inner faces of the basket sides, whereby said bail member may be swung downwardly to bring the hand engaging portion in engagement with the bottom of the basket, and the side arms adjacent to the inner faces of the opposite sides of the basket, to permit the baskets to be nested after the handles have been applied thereto.

11. A handle for wooden baskets, comprising a pair of side members for engaging the inner faces of the sides of the basket at opposite points, each of said side members being provided at its upper end with a horizontally extending attaching point adapted to pass through the side of the basket adjacent to its upper edge and secured thereto, each side member being provided on its lower end with an attaching point adapted to pass directly through the bottom of the basket and to be secured thereto, and a bail member comprising a hand engaging part and side arms having integral loops for surrounding and pivotally engaging the horizontal attaching points at the upper ends of the said arms on the inner faces of the basket sides, whereby said bail member may be swung downwardly to bring the hand engaging portion in engagement with the bottom of the basket, and the side arms adjacent to the inner faces of the opposite sides of the basket, to permit the baskets to be nested after the handles have been applied thereto, said bail arms having integral projections extending beyond said loops and provided adjacent to their outer ends with locking portions for engaging the side members between their attaching points to hold the bail member rigidly locked with respect to the side members when in vertical position.

12. The combination with a wooden basket including a bottom and side walls, of handle securing members arranged within the basket and secured directly to the bottom and a bail member pivotally connected to said securing members and adapted to fold down inside of the basket, said bail member being constructed with a hand engaging portion and arm portions, said arm portions being arranged to lie in substantial parallelism with the side walls and closely adjacent thereto, and said hand engaging portion arranged to lie substantially parallel with the bottom of the basket when said bail member is folded within the basket to permit nesting of the baskets.

13. In combustion, a wooden basket including veneer sides, reinforcing means adjacent the top edges of the sides and a bottom secured to the sides, and a bail supporting means comprising side members extending vertically within the veneer sides of the basket, said members being connected with the reinforcing means adjacent their upper ends and directly with the bottom at their lower ends to provide a direct support therefor.

In testimony whereof I affix my signature.

HENRY W. KRAMER.